US011119569B2

(12) United States Patent
Nachum et al.

(10) Patent No.: US 11,119,569 B2
(45) Date of Patent: Sep. 14, 2021

(54) REAL-TIME VISUAL PLAYBACKS

(71) Applicant: International Business Machines Corporation, Armonk, NY (US)

(72) Inventors: Yahel Nachum, Northborough, MA (US); Chowdhury Annur, Lowell, MA (US); Aashil Patel, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 16/793,005

(22) Filed: Feb. 18, 2020

(65) Prior Publication Data

US 2021/0255692 A1    Aug. 19, 2021

(51) Int. Cl.
*G06F 3/01* (2006.01)

(52) U.S. Cl.
CPC ........ *G06F 3/011* (2013.01); *G06F 2203/012* (2013.01)

(58) Field of Classification Search
CPC ....... G06F 2203/012; G06F 3/011–017; G06F 3/01; G06F 3/0334; G09G 5/00; G06T 15/70; A63B 22/02; A63B 24/0021; A43B 3/0005; A63F 13/24; A61B 5/112
USPC ........................................................ 345/156
See application file for complete search history.

(56) References Cited

U.S. PATENT DOCUMENTS

| | | | |
|---|---|---|---|
| 9,652,037 B2 | 5/2017 | Rubin et al. | |
| 9,904,358 B2 | 2/2018 | Rubin et al. | |
| 10,127,730 B2 | 11/2018 | Huddy | |
| 2005/0131580 A1* | 6/2005 | Kurzweil | B25J 13/00 700/245 |
| 2007/0109259 A1* | 5/2007 | Liu | G06F 3/011 345/156 |
| 2016/0250519 A1* | 9/2016 | Watterson | A63B 24/0075 482/4 |
| 2017/0124767 A1* | 5/2017 | Foust | G06T 7/20 |
| 2018/0217662 A1* | 8/2018 | Smoot | G06F 3/0334 |

FOREIGN PATENT DOCUMENTS

| | | |
|---|---|---|
| CN | 202584476 U | 12/2012 |
| CN | 203552502 U | 4/2014 |
| CN | 103413480 A | 9/2015 |
| CN | 103871292 A | 1/2017 |

(Continued)

OTHER PUBLICATIONS

Iwata et al., "CirculaFloor," IEEE Computer Graphics and Applications, vol. 2, Issue: 1, Jan. 2005, pp. 64-67.

(Continued)

*Primary Examiner* — Amare Mengistu
*Assistant Examiner* — Gloryvid Figueroa-Gibson
(74) *Attorney, Agent, or Firm* — VanLeeuwen & VanLeeuwen; Alexander Jochym

(57) ABSTRACT

An approach is provided in which the approach captures a set of sensory data corresponding to a first user traversing over a physical terrain in a physical world. The approach uses the set of sensory data to create a set of instructions to emulate the physical world by a locomotion system. The approach invokes the locomotion system to emulate the physical terrain utilizing the set of instructions while a second user is positioned on the locomotion system and using a virtual reality device to traverse through a virtual world.

17 Claims, 10 Drawing Sheets

(56) References Cited

FOREIGN PATENT DOCUMENTS

| CN | 106530892 A | 3/2019 |
|---|---|---|
| CN | 106249903 A | 4/2019 |
| WO | 201929100 W | 2/2019 |

OTHER PUBLICATIONS

"Foldaway pushbutton: use your finger to feel virtual objects stiffness," Foldaway haptics, 2017, 2 pages.
"Haptic feedback that feels like the real thing," HaptX Inc., 2019, 8 pages.
Lang, "Hands-on: Infinadeck's Latest Prototype is the Most Natural Feeling VR Treadmill Yet," Road to VR, Apr. 2018, 4 pages.
Follmer et al., "inFORM: Dynamic Physical Affordances and Constraints through Shape and Object Actuation," Proceedings of the 26th annual ACM symposium on User interface software and technology, St. Andrews, United Kingdom, Oct. 2013, 10 pages.
"ShapeShift: A Mobile Tabletop Shape Display for Tangible and Haptic Interaction," Stanford University Department of Mechanical Engineering, 2018, 3 pages.

\* cited by examiner

REAL-TIME VISUAL PLAYBACKS

BACKGROUND

Users have been sharing experiences for some time, and each new technology adds more quality and accuracy to sharing the experiences. At the turn of the 21st century, video recorders were very common because of their low cost and portability. Users used the video recorders to record vacation experiences and subsequently show videos to family and friends.

Today, virtual reality is on the forefront of adding a "presence" to these types of experiences. Virtual reality (VR) is a simulated experience that can be similar to, or completely different from, the real world (physical world). Some virtual reality applications include entertainment (e.g., video games), education (e.g., medical, military training). At times, users capture experiences using multiple cameras that are aligned to capture a complete 360 degree view.

VR locomotion is technology that enables a user to move from one place to another (locomotion) within a virtual reality environment (virtual world). A variety of approaches enable a user to move through a virtual world using virtual reality locomotion, such as by using an omnidirectional treadmill that allows a user to move in any direction.

BRIEF SUMMARY

According to one embodiment of the present disclosure, an approach is provided in which the approach captures a set of sensory data corresponding to a first user traversing over a physical terrain in a physical world. The approach uses the set of sensory data to create a set of instructions to emulate the physical world by a locomotion system. The approach invokes the locomotion system to emulate the physical terrain utilizing the set of instructions while a second user is positioned on the locomotion system and using a virtual reality device to traverse through a virtual world.

The foregoing is a summary and thus contains, by necessity, simplifications, generalizations, and omissions of detail; consequently, those skilled in the art will appreciate that the summary is illustrative only and is not intended to be in any way limiting. Other aspects, inventive features, and advantages of the present disclosure, as defined solely by the claims, will become apparent in the non-limiting detailed description set forth below.

BRIEF DESCRIPTION OF THE SEVERAL VIEWS OF THE DRAWINGS

The present disclosure may be better understood, and its numerous objects, features, and advantages made apparent to those skilled in the art by referencing the accompanying drawings, wherein.

DETAILED DESCRIPTION

Figure 1:
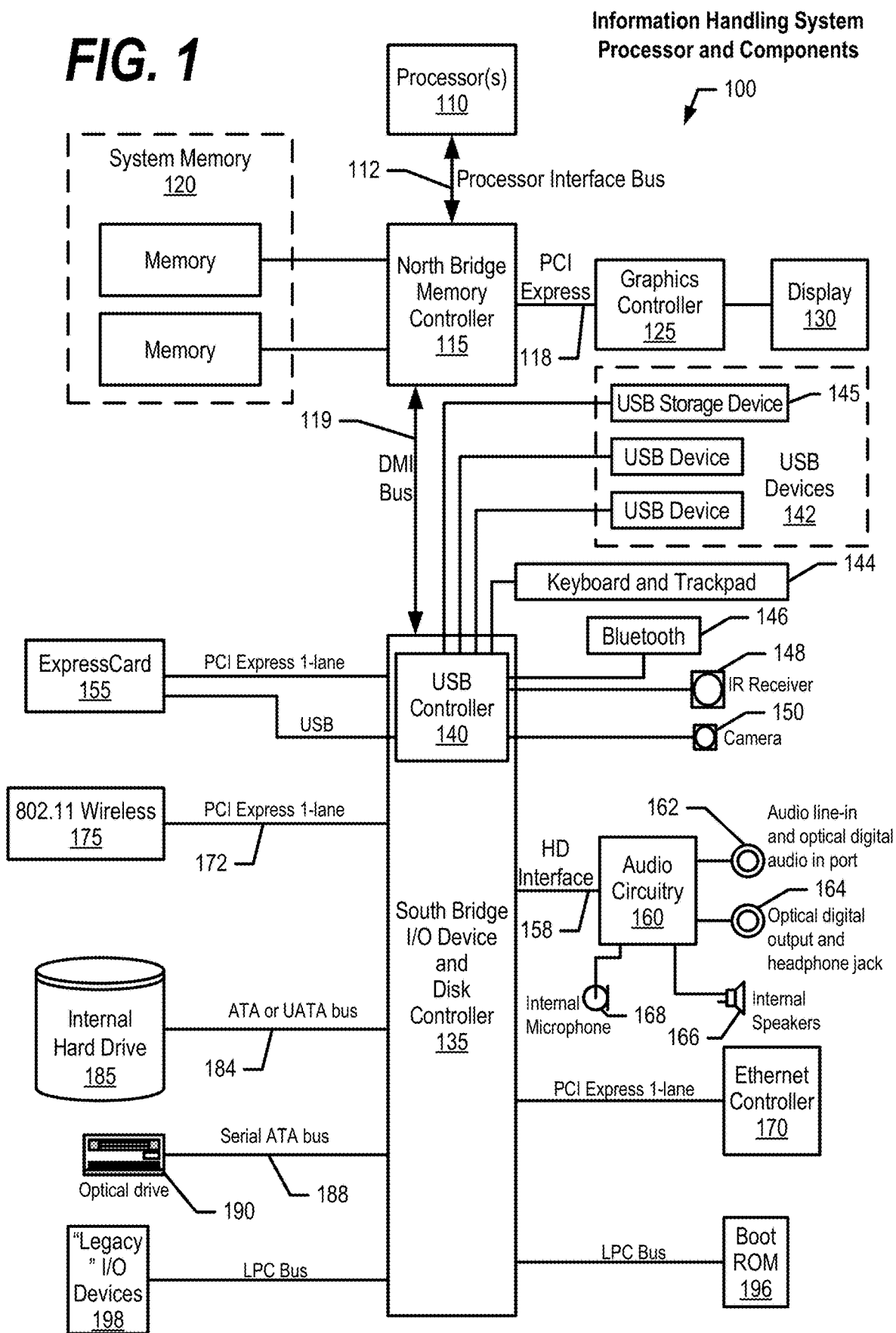
FIG. 1 is a block diagram of a data processing system in which the methods described herein can be implemented.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions. The following detailed description will generally follow the summary of the disclosure, as set forth above, further explaining and expanding the definitions of the various aspects and embodiments of the disclosure as necessary.

FIG. 1 illustrates information handling system 100, which is a simplified example of a computer system capable of performing the computing operations described herein. Information handling system 100 includes one or more processors 110 coupled to processor interface bus 112. Processor interface bus 112 connects processors 110 to Northbridge 115, which is also known as the Memory Controller Hub (MCH). Northbridge 115 connects to system memory 120 and provides a means for processor(s) 110 to access the system memory. Graphics controller 125 also connects to Northbridge 115. In one embodiment, Peripheral Component Interconnect (PCI) Express bus 118 connects Northbridge 115 to graphics controller 125. Graphics controller 125 connects to display device 130, such as a computer monitor.

Northbridge 115 and Southbridge 135 connect to each other using bus 119. In some embodiments, the bus is a Direct Media Interface (DMI) bus that transfers data at high speeds in each direction between Northbridge 115 and Southbridge 135. In some embodiments, a PCI bus connects the Northbridge and the Southbridge. Southbridge 135, also known as the Input/Output (I/O) Controller Hub (ICH) is a chip that generally implements capabilities that operate at slower speeds than the capabilities provided by the Northbridge. Southbridge 135 typically provides various busses used to connect various components. These busses include, for example, PCI and PCI Express busses, an ISA bus, a System Management Bus (SMBus or SMB), and/or a Low Pin Count (LPC) bus. The LPC bus often connects low-bandwidth devices, such as boot ROM 196 and "legacy" I/O devices (using a "super I/O" chip). The "legacy" I/O devices (198) can include, for example, serial and parallel ports, keyboard, mouse, and/or a floppy disk controller. Other components often included in Southbridge 135 include a Direct Memory Access (DMA) controller, a Programmable Interrupt Controller (PIC), and a storage device controller, which connects Southbridge 135 to nonvolatile storage device 185, such as a hard disk drive, using bus 184.

ExpressCard 155 is a slot that connects hot-pluggable devices to the information handling system. ExpressCard 155 supports both PCI Express and Universal Serial Bus (USB) connectivity as it connects to Southbridge 135 using both the USB and the PCI Express bus. Southbridge 135 includes USB Controller 140 that provides USB connectivity to devices that connect to the USB. These devices include webcam (camera) 150, infrared (IR) receiver 148, keyboard and trackpad 144, and Bluetooth device 146, which provides for wireless personal area networks (PANs). USB Controller 140 also provides USB connectivity to other miscellaneous USB connected devices 142, such as a mouse, removable nonvolatile storage device 145, modems, network cards, Integrated Services Digital Network (ISDN) connectors, fax, printers, USB hubs, and many other types of USB connected devices. While removable nonvolatile storage device 145 is shown as a USB-connected device, removable nonvolatile storage device 145 could be connected using a different interface, such as a Firewire interface, etcetera.

Wireless Local Area Network (LAN) device 175 connects to Southbridge 135 via the PCI or PCI Express bus 172. LAN device 175 typically implements one of the Institute of Electrical and Electronic Engineers (IEEE) 802.11 standards of over-the-air modulation techniques that all use the same protocol to wirelessly communicate between information handling system 100 and another computer system or device. Optical storage device 190 connects to Southbridge 135 using Serial Analog Telephone Adapter (ATA) (SATA) bus 188. Serial ATA adapters and devices communicate over a high-speed serial link. The Serial ATA bus also connects Southbridge 135 to other forms of storage devices, such as hard disk drives. Audio circuitry 160, such as a sound card, connects to Southbridge 135 via bus 158. Audio circuitry 160 also provides functionality associated with audio hardware such as audio line-in and optical digital audio in port 162, optical digital output and headphone jack 164, internal speakers 166, and internal microphone 168. Ethernet controller 170 connects to Southbridge 135 using a bus, such as the PCI or PCI Express bus. Ethernet controller 170 connects information handling system 100 to a computer network, such as a Local Area Network (LAN), the Internet, and other public and private computer networks.

While FIG. 1 shows one information handling system, an information handling system may take many forms. For example, an information handling system may take the form of a desktop, server, portable, laptop, notebook, or other form factor computer or data processing system. In addition, an information handling system may take other form factors such as a personal digital assistant (PDA), a gaming device, Automated Teller Machine (ATM), a portable telephone device, a communication device or other devices that include a processor and memory.

Figure 2:
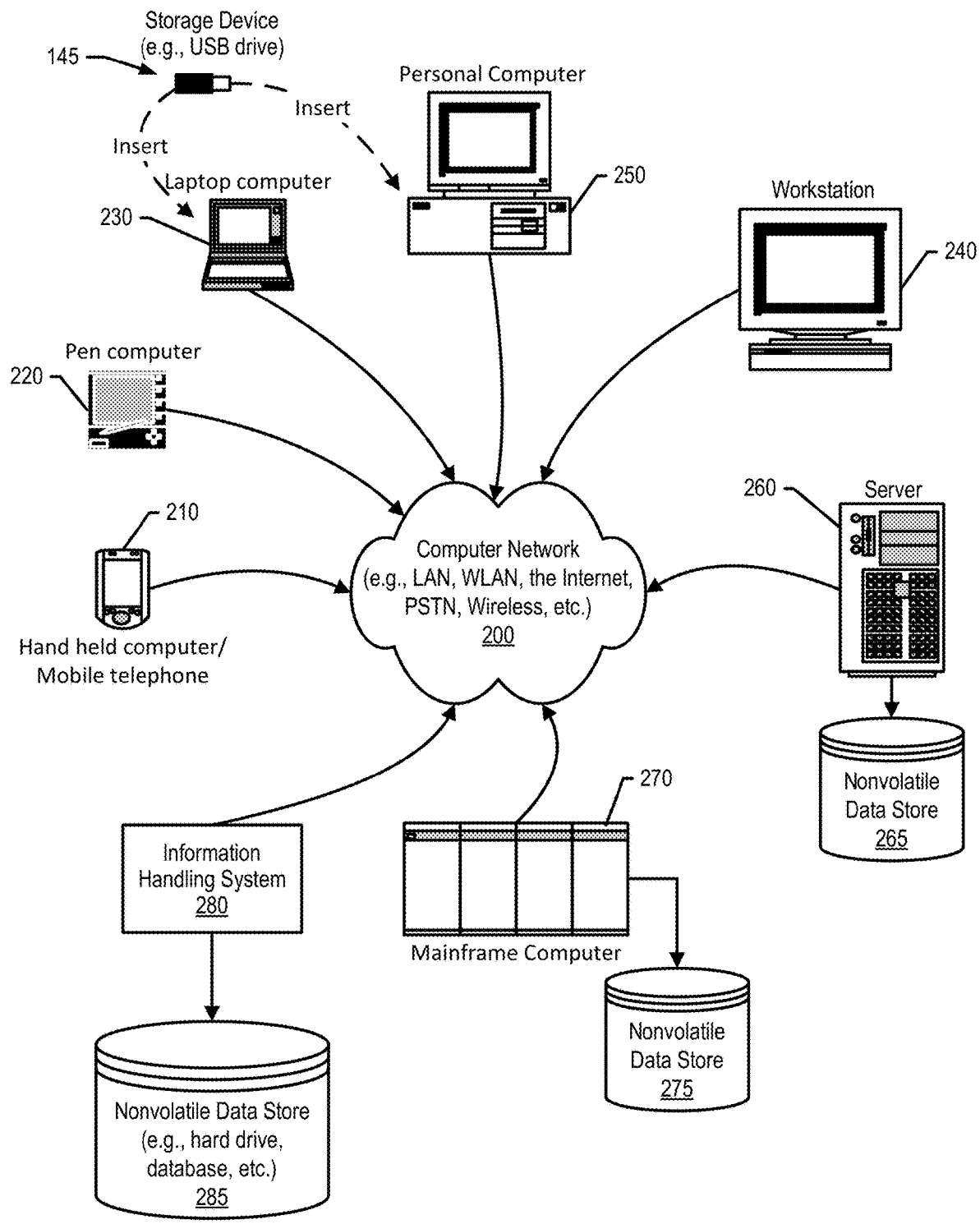
FIG. 2 provides an extension of the information handling system environment shown in FIG. 1 to illustrate that the methods described herein can be performed on a wide variety of information handling systems which operate in a networked environment.

FIG. 2 provides an extension of the information handling system environment shown in FIG. 1 to illustrate that the methods described herein can be performed on a wide variety of information handling systems that operate in a networked environment. Types of information handling systems range from small handheld devices, such as handheld computer/mobile telephone 210 to large mainframe systems, such as mainframe computer 270. Examples of handheld computer 210 include personal digital assistants (PDAs), personal entertainment devices, such as Moving Picture Experts Group Layer-3 Audio (MP3) players, portable televisions, and compact disc players. Other examples of information handling systems include pen, or tablet, computer 220, laptop, or notebook, computer 230, workstation 240, personal computer system 250, and server 260. Other types of information handling systems that are not individually shown in FIG. 2 are represented by information handling system 280. As shown, the various information handling systems can be networked together using computer network 200. Types of computer network that can be used to interconnect the various information handling systems include Local Area Networks (LANs), Wireless Local Area Networks (WLANs), the Internet, the Public Switched Telephone Network (PSTN), other wireless networks, and any other network topology that can be used to interconnect the information handling systems. Many of the information handling systems include nonvolatile data stores, such as hard drives and/or nonvolatile memory. The embodiment of the information handling system shown in FIG. 2 includes separate nonvolatile data stores (more specifically, server 260 utilizes nonvolatile data store 265, mainframe computer 270 utilizes nonvolatile data store 275, and information handling system 280 utilizes nonvolatile data store 285). The nonvolatile data store can be a component that is external to the various information handling systems or can be internal to one of the information handling systems. In addition, removable nonvolatile storage device 145 can be shared among two or more information handling systems using various techniques, such as connecting the removable nonvolatile storage device 145 to a USB port or other connector of the information handling systems.

As discussed above, VR locomotion enables a user to move from one place to another within a virtual world. A challenge found, however, is that current VR locomotion systems do not emulate the terrain of the real world in real time. FIGS. 3 through 10 depict an approach that can be executed on an information handling system that renders a virtual reality experience in real-time based on real-time inputs. The approach collects a set of data from an array of sensors on a first user traversing through a physical terrain in a physical world. The approach creates a set of hardware instructions in real-time based on the set of data and sends the set of hardware instructions to a locomotion system. A second user stands on the locomotion system while operating in a virtual world (e.g., headset attached) and, as the first user and the second user move in their respective worlds, the locomotion system emulates the feel of the physical terrain within the second user's virtual world.

Figure 3:
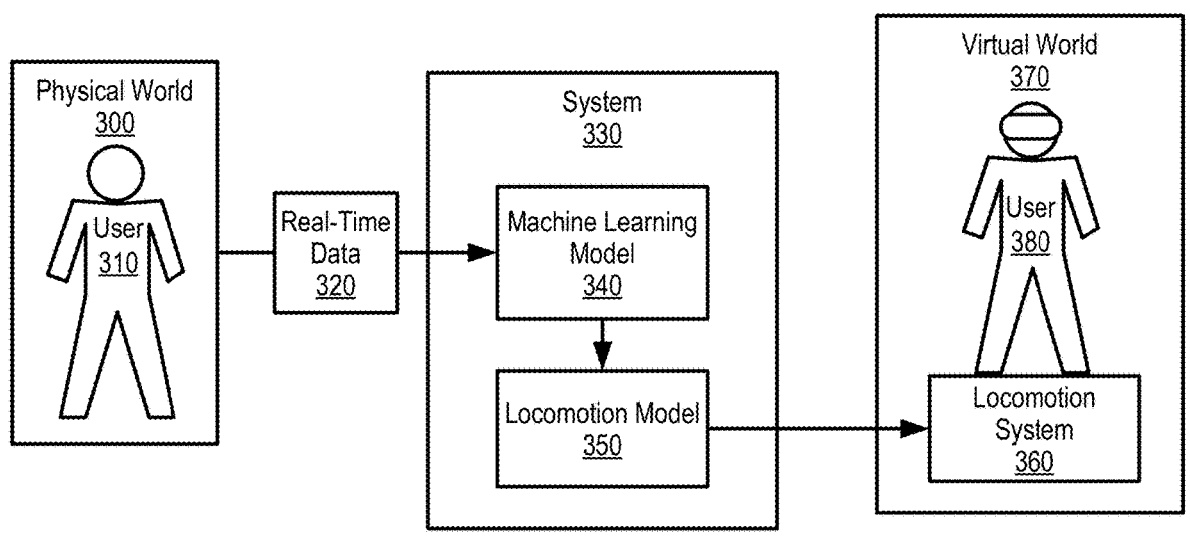
FIG. 3 is an exemplary diagram depicting an approach of emulating in real-time, within a virtual world, a feel of a physical terrain from a physical world.

FIG. 3 is an exemplary diagram depicting an approach of emulating a feel of a physical terrain in a virtual world. User 310 is in physical world 300 and uses sensors to collect real-time data 320, such as visual data, location data, and weather data. System 330 receives real-time data 320 and uses machine learning model 340 to generate terrain roughness data and scaled metrics data of a physical terrain in physical world 300.

Machine learning model 340 feeds the terrain roughness data and scaled metrics information into locomotion model 350. Locomotion model 350 generates hardware instructions and feeds the hardware instructions to locomotion system 360 to emulate physical world 300's physical terrain. In turn, by user 380 standing on locomotion system 360, user 380 experiences physical world 300's physical terrain while user 380 traverses virtual world 370.

In one embodiment, machine learning model 340 scales the emulation based on physical attribute differences (e.g., height, weight, etc.) between user 310 and user 380. For example, when a tall person hikes a trail and records the hike, the difficulty of hiking the trail for the tall person is different for someone whose height is not the same (e.g., step size). Therefore, scaling the difficulty for the locomotion user 380 relative to the person who recorded the experience (user 310) is vital to emulate a realistic environment.

Figure 4:
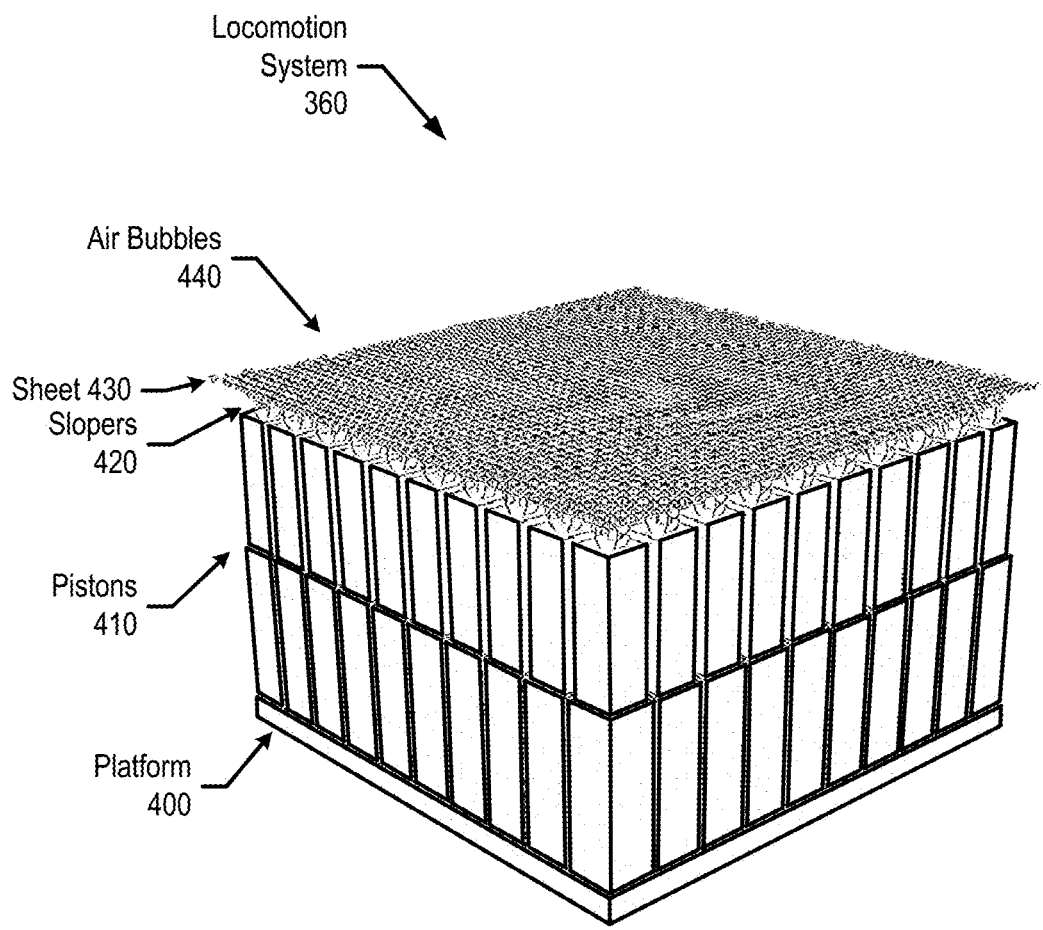
FIG. 4 is an exemplary diagram depicting a locomotion system as described herein.

FIG. 4 is an exemplary diagram depicting a locomotion system as described herein. FIG. 4 shows a particular implementation of locomotion system 360 and other implementations are feasible based on resource constraints. Locomotion system 360 includes five different components, which are platform 400, pistons 410, slopers 420, flexible sheet 430, and air bubbles 440.

Platform 400 moves in the x, y, and z direction (left/right, forward/backward, up/down). In one embodiment, locomotion system 360 includes multiple platforms 400 that are mobile and move around user 380 based on a direction of a user 380's movement. As platforms 400 move, their respective sub-components 410, 420, 430, and 440 move in accordance to the elevation change that user 380 should be experience. On top of each platform 400 is a 2-dimensional array of pistons 410 that move in the z direction. Pistons 410 simulate different elevations within a single platform 400.

On top of each piston 410 is a sloper 420 that moves in the z direction and rotates on the x-axis and y-axis. Slopers 420 rotate to produce uneven elevation within a single piston 410. Instead of a blocky estimation of the terrain, slopers 420 simulate the slope of the terrain (includes flat paths such as pavement, basketball courts, etc.). Each sloper 420 also flexes variably underneath a person's step to simulate different materials. For example, based on terrain roughness data, a muddy terrain feels softer than a concrete terrain.

Sheet 430 covers slopers 420 on platform 400 into a single mesh of terrain. On top of sheet 430 is a 2-dimensional array of air bubbles 440 that moves in the z direction. Air bubbles 440 add a texture to the terrain. For example, a rocky terrain exhibits a rougher texture than a smoothly packed dirt trail.

Figure 5:
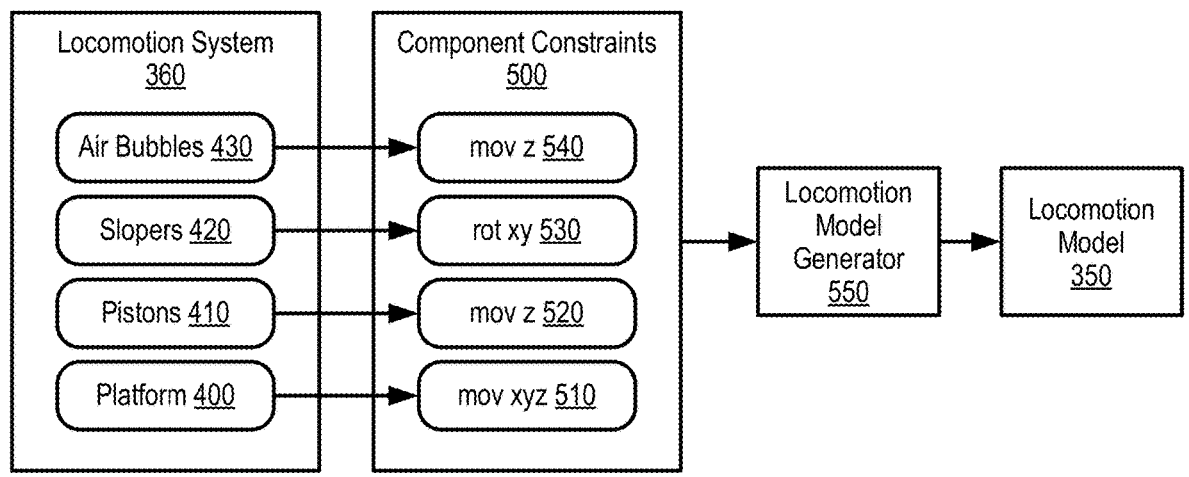
FIG. 5 is an exemplary diagram depicting an approach to create a locomotion model.

FIG. 5 is an exemplary diagram depicting an approach to create a locomotion model. Locomotion model 350 is a virtual model of locomotion system 360 and, as discussed herein, translates processed data from machine learning model 340 into specific hardware instructions to instruct each component of locomotion system 360 on how to behave.

The approach discussed herein uses two general sets of information to create locomotion model 350. The first set of information specifies the structural relationship between components, such as pistons 410 are on top of platform 400, slopers 420 are on top of pistons 410, and etcetera. The second set of information specifies each component's constraints in the physical world (x direction, y direction, z direction). As discussed herein, "mov" indicates a direction restriction and "rot" indicates a rotation restriction. For example, "mov xy" indicates that the movement is restricted in the xy direction, and "rot xy" indicates that the rotation is restricted to the xy axis.

Component constraints 500 shows mov xyz 510 are platform 400's constraints, mov z 520 are pistons 410 constraints, rot xy 530 are slopers 420 constraints, and mov z 540 are air bubbles 430 constraints.

The two sets of information feed into locomotion model generator 550 to create locomotion model 350. In turn, locomotion model 350 uses inverse kinematics to translate a three dimensional surface (processed data from machine learning model 340) to hardware instructions for each of locomotion system 360's components (see FIG. 7 and corresponding text for further details).

Figure 6:
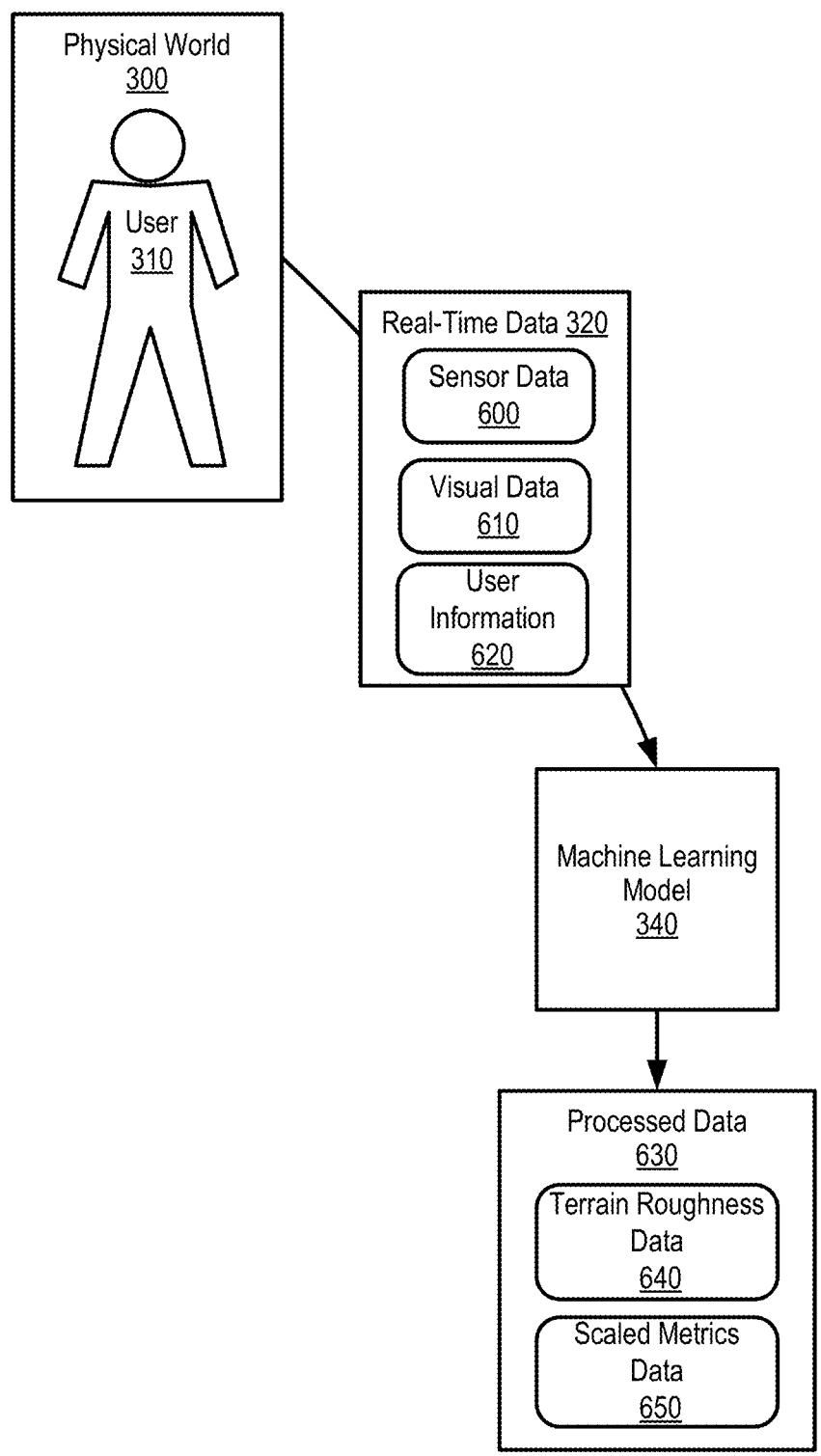
FIG. 6 is an exemplary diagram depicting an approach to collect data from a set of sensors and process the data through a machine learning model to generate terrain roughness and scaled metrics.

FIG. 6 is an exemplary diagram depicting an approach to collect data from a set of sensors and process the data through a machine learning model to generate terrain roughness data and scaled metrics data. System 330 begins by training machine learning model 340 using training data, test data, and supervised machine learning models (see FIG. 9 and corresponding text for further details).

Once trained, machine learning model 340 receives real-time data 320 from user 310's sensors, which include sensor data 600 (e.g., weather data, distance, elevation, etc.), visual data 610, and user information 620, such as user 310's height and weight. In one embodiment, real-time data 320 is captured through cell phones, video cameras, and/or wearable gadgets. Machine learning model 340 generates processed data 630, which includes terrain roughness 640 and scaled metrics 650 that, in turn, feeds into locomotion model 350 for further processing (see FIG. 7 and corresponding text for further details).

Figure 7:
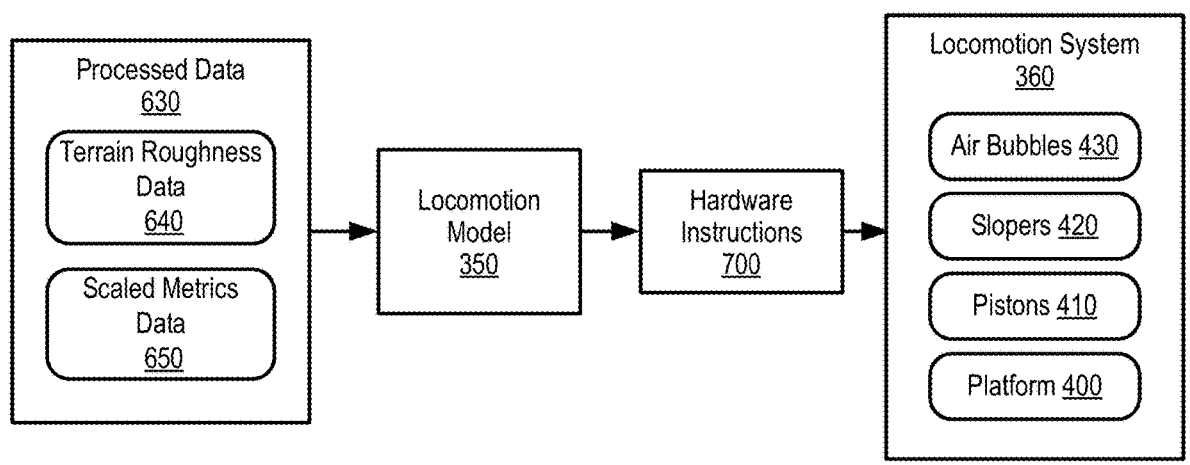
FIG. 7 is an exemplary diagram depicting a locomotion model generating hardware instructions based on processed data generated from a machine learning model.

FIG. 7 is an exemplary diagram depicting a locomotion model generating locomotion system hardware instructions based on processed data generated from machine learning model 340. Hardware instructions 700 inform each component (400, 410, 420, 430) how to move and when to move to accurately simulate the physical terrain of physical world 300.

In one embodiment, locomotion model 350 provides instructions for how each component should move to react to user 380's movement. For example, when user 380 steps forward, system 330 re-centers user 380 by moving one of locomotion system's platform 400 in a backward direction. System 330 also re-centers user 380 in the z direction. For example, when user 380 moves up a slope, system 330 re-centers user 380 by moving pistons 410 downward at some point to allow user 380 to continue moving upward.

Figure 8:
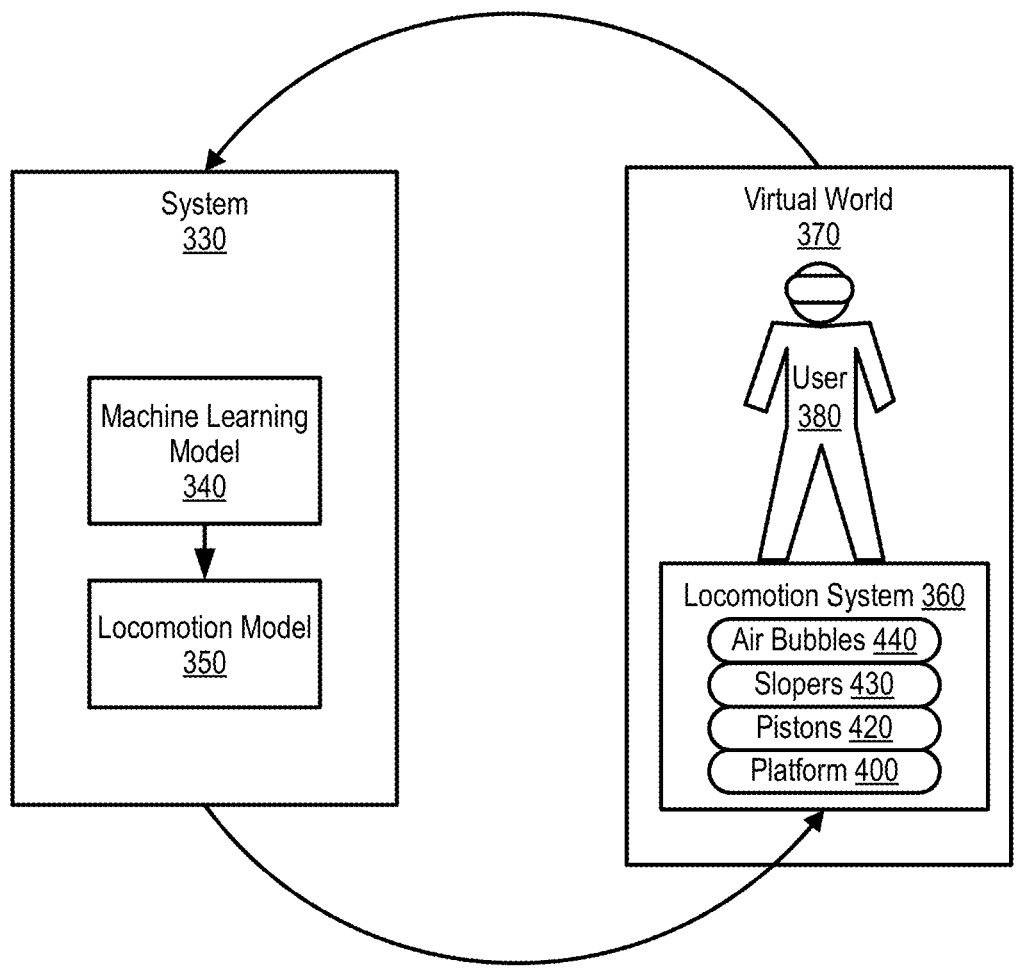
FIG. 8 is an exemplary diagram depicting a system adjusting a locomotion system as a user walks over different terrain.

FIG. 8 is an exemplary diagram depicting system 330 adjusting locomotion system 360 as user 380 traverses over a terrain. As user 380 walks in virtual world 370, system 330 responds accordingly and keeps user 380 in the center of an area. System 300 continually adjusts locomotion system 360 until user 380 exits virtual world 370, such as by taking off a VR headset.

Figure 9:
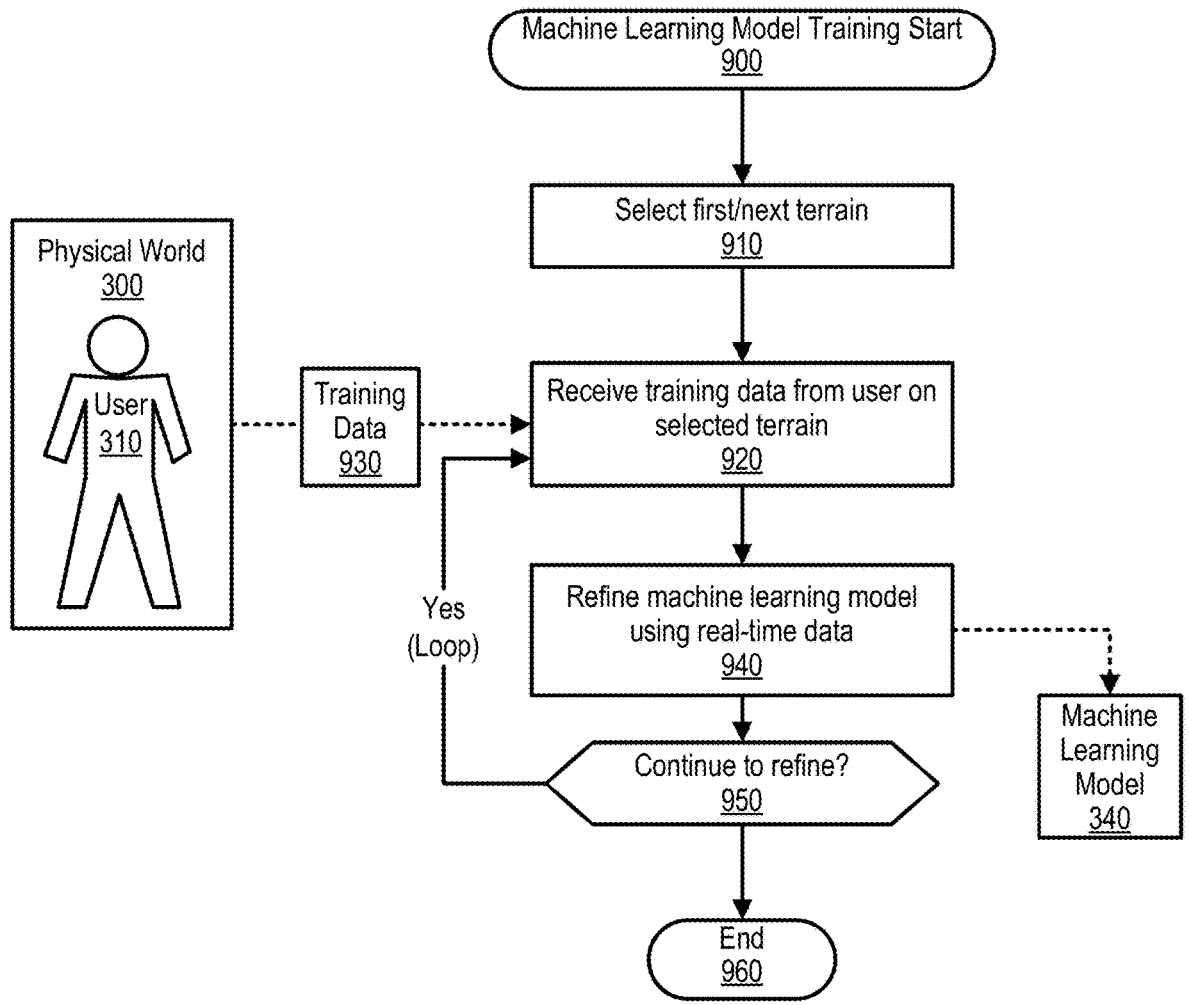
FIG. 9 is an exemplary flowchart showing steps taken to train a machine learning model.

FIG. 9 is an exemplary flowchart showing steps taken to refine machine learning model 340. In one embodiment, machine learning model 340 is trained using a set of corpus data prior to being refined by real-time data as discussed below. FIG. 9 processing commences at 900 whereupon, at step 910, the process selects a first terrain, such as a forest terrain. At step 920, the process receives training data 930 from user 310 walking in the selected terrain. At step 940, the process trains machine learning model 340 using training data 930. In one embodiment, machine learning model 340 takes in training data 930 in sequential time chunks and follows a sliding window protocol to process multiple frames over the course of an entire journey.

The process determines as to whether to continue to refine machine learning model 340 (e.g., user 310 is still walking) (decision 950). If the process should continue, then decision 950 branches to the 'yes' branch which loops back to continue to process training data. This looping continues until the process should terminate, at which point decision 950 branches to the 'no' branch exiting the loop. FIG. 9 processing thereafter ends at 960.

Figure 10:
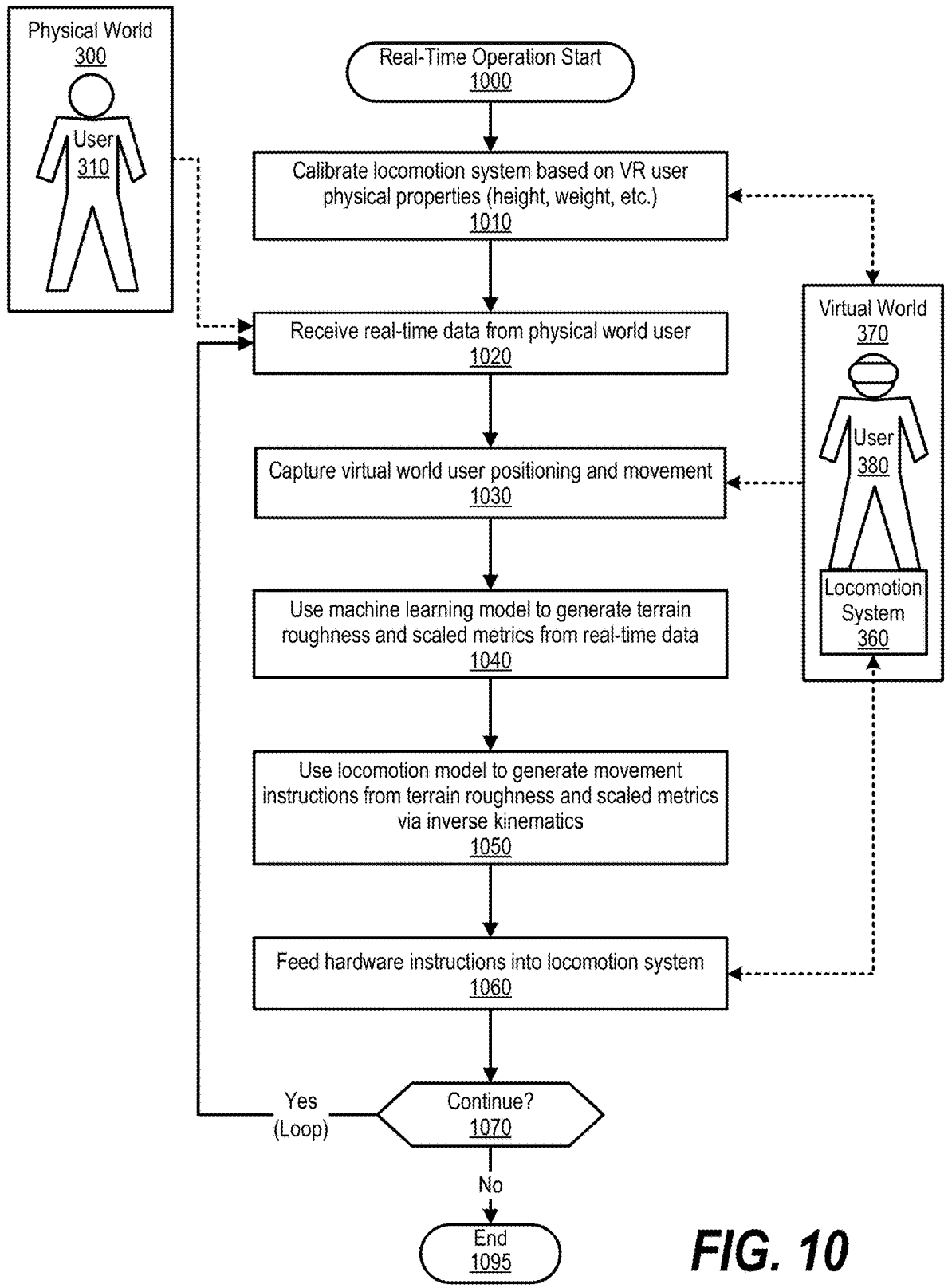
FIG. 10 is an exemplary flowchart showing steps taken to emulate in real-time, within a virtual world, a feel of a physical terrain from a physical world.

FIG. 10 is an exemplary flowchart showing steps taken to emulate in real-time, within a virtual world, a feel of a physical terrain from a physical world. FIG. 10 processing commences at 1000 whereupon, at step 1010, the process calibrates locomotion system 360 based on VR user 380's physical properties (height, weight, etc.). At step 1020, the process receives real-time data from physical world user 310. At step 1030, the process captures virtual world user 380's positioning and movement. At step 1040, the process uses machine learning model 340 to generate terrain roughness data 640 and scaled metrics data 650 from real-time data.

At step 1050, the process uses locomotion model 350 to generate hardware instructions 700 from terrain roughness data 640 and scaled metrics data 650 via inverse kinematics. At step 1060, the process feeds hardware 700 instructions into locomotion system 360. The process determines as to whether to continue (decision 1070). If the process should continue, then decision 1070 branches to the 'yes' branch which loops back to receive and process more real-time data from user 310. This looping continues until user 380 terminates a virtual world session, at which point decision 1070 branches to the 'no' branch exiting the loop. FIG. 10 processing thereafter ends at 1095.

While particular embodiments of the present disclosure have been shown and described, it will be obvious to those skilled in the art that, based upon the teachings herein, that changes and modifications may be made without departing from this disclosure and its broader aspects. Therefore, the appended claims are to encompass within their scope all such changes and modifications as are within the true spirit and scope of this disclosure. Furthermore, it is to be understood that the disclosure is solely defined by the appended claims. It will be understood by those with skill in the art that if a specific number of an introduced claim element is intended, such intent will be explicitly recited in the claim, and in the absence of such recitation no such limitation is present. For non-limiting example, as an aid to understanding, the following appended claims contain usage of the introductory phrases "at least one" and "one or more" to introduce claim elements. However, the use of such phrases should not be construed to imply that the introduction of a claim element by the indefinite articles "a" or "an" limits any particular claim containing such introduced claim element to disclosures containing only one such element, even when the same claim includes the introductory phrases "one or more" or "at least one" and indefinite articles such as "a" or "an"; the same holds true for the use in the claims of definite articles.

The invention claimed is:

1. A method implemented by an information handling system that includes a memory and a processor, the method comprising:
    capturing a set of sensory data corresponding to a first user traversing over a physical terrain in a physical world in real-time, wherein the first user corresponds to a first set of physical attributes;
    detecting that a second user is using a locomotion system and a virtual reality device to traverse through a virtual world, wherein the second user corresponds to a second set of physical attributes;
    comparing, in real-time, the first set of physical attributes against the second set of physical attributes;
    determining a difference in height between the first user and the second user in response to the comparing;
    generating a set of scaled metrics based on the difference in height;
    creating, based on the set of sensory data and the set of scaled metrics, a set of instructions to emulate the physical terrain by the locomotion system; and
    invoking the locomotion system to emulate the physical terrain utilizing the set of instructions while the second user is positioned on the locomotion system and using the virtual reality device to traverse through the virtual world.

2. The method of claim 1 wherein the first user traverses through the physical terrain in the physical world at a same time as the locomotion system emulates the physical terrain for the second user traversing through the virtual world.

3. The method of claim 1 further comprising:
    determining a difference in weight between the first user and the second user based in response to the comparing;
    generating a set of terrain roughness data based on the difference in weight; and
    factoring the set of terrain roughness data into the creating of the set of instructions.

4. The method of claim 1 wherein the locomotion system comprises at least one platform, a set of pistons positioned on top of the at least one platform, a set of slopers positioned on top of the set of pistons, at least one sheet positioned on top of the set of slopers, and a set of air bubbles positioned on top of the at least one sheet.

5. The method of claim 4 wherein the creating of the set of instructions further comprises:
    generating a first subset of the set of instructions that instruct the at least one platform to move in a first direction based on a first set of constraints corresponding to the at least one platform;
    generating a second subset of the set of instructions that instruct the set of pistons to move in a second direction based on a second set of constraints corresponding to the set of pistons;
    generating a third subset of the set of instructions that instruct the set of slopers to rotate in a third direction based on a third set of constraints corresponding to the set of slopers; and
    generating a fourth subset of the set of instructions that instruct the set of air bubbles to move in a fourth direction based on a fourth set of constraints corresponding to the set of air bubbles.

6. The method of claim 4 wherein the locomotion system comprises a plurality of platforms that each move independently based on a movement direction of the second user in the virtual world.

7. An information handling system comprising:
    one or more processors;
    a memory coupled to at least one of the processors;
    a set of computer program instructions stored in the memory and executed by at least one of the processors in order to perform actions of:
        capturing a set of sensory data corresponding to a first user traversing over a physical terrain in a physical world in real-time, wherein the first user corresponds to a first set of physical attributes;

detecting that a second user is using a locomotion system and a virtual reality device to traverse through a virtual world, wherein the second user corresponds to a second set of physical attributes;

comparing, in real-time, the first set of physical attributes against the second set of physical attributes;

determining a difference in height between the first user and the second user in response to the comparing;

generating a set of scaled metrics based on the difference in height;

creating, based on the set of sensory data and the set of scaled metrics, a set of instructions to emulate the physical terrain by the locomotion system; and invoking the locomotion system to emulate the physical terrain utilizing the set of instructions while the second user is positioned on the locomotion system and using the virtual reality device to traverse through the virtual world.

8. The information handling system of claim 7 wherein the first user traverses through the physical terrain in the physical world at a same time as the locomotion system emulates the physical terrain for the second user traversing through the virtual world.

9. The information handling system of claim 7 wherein the processors perform additional actions comprising:

determining a difference in weight between the first user and the second user based in response to the comparing;

generating a set of terrain roughness data based on the difference in weight; and factoring the set of terrain roughness data into the creating of the set of instructions.

10. The information handling system of claim 7 wherein the locomotion system comprises at least one platform, a set of pistons positioned on top of the at least one platform, a set of slopers positioned on top of the set of pistons, at least one sheet positioned on top of the set of slopers, and a set of air bubbles positioned on top of the at least one sheet.

11. The information handling system of claim 10 wherein the processors perform additional actions comprising:

generating a first subset of the set of instructions that instruct the at least one platform to move in a first direction based on a first set of constraints corresponding to the at least one platform;

generating a second subset of the set of instructions that instruct the set of pistons to move in a second direction based on a second set of constraints corresponding to the set of pistons;

generating a third subset of the set of instructions that instruct the set of slopers to rotate in a third direction based on a third set of constraints corresponding to the set of slopers; and generating a fourth subset of the set of instructions that instruct the set of air bubbles to move in a fourth direction based on a fourth set of constraints corresponding to the set of air bubbles.

12. The information handling system of claim 10 wherein the locomotion system comprises a plurality of platforms that each move independently based on a movement direction of the second user in the virtual world.

13. A computer program product stored in a computer readable storage medium, comprising computer program code that, when executed by a processor in an information handling system, causes the information handling system to perform actions comprising:

capturing a set of sensory data corresponding to a first user traversing over a physical terrain in a physical world in real-time, wherein the first user corresponds to a first set of physical attributes;

detecting that a second user is using a locomotion system and a virtual reality device to traverse through a virtual world, wherein the second user corresponds to a second set of physical attributes;

comparing, in real-time, the first set of physical attributes against the second set of physical attributes;

determining a difference in height between the first user and the second user in response to the comparing;

generating a set of scaled metrics based on the difference in height;

creating, based on the set of sensory data and the set of scaled metrics, a set of instructions to emulate the physical terrain by the locomotion system; and invoking the locomotion system to emulate the physical terrain utilizing the set of instructions while the second user is positioned on the locomotion system and using the virtual reality device to traverse through the virtual world.

14. The computer program product of claim 13 wherein the first user traverses through the physical terrain in the physical world at a same time as the locomotion system emulates the physical terrain for the second user traversing through the virtual world.

15. The computer program product of claim 13 wherein the information handling system performs further actions comprising:

determining a difference in weight between the first user and the second user based in response to the comparing;

generating a set of terrain roughness data based on the difference in weight; and factoring the set of terrain roughness data into the creating of the set of instructions.

16. The computer program product of claim 13 wherein the locomotion system comprises at least one platform, a set of pistons positioned on top of the at least one platform, a set of slopers positioned on top of the set of pistons, at least one sheet positioned on top of the set of slopers, and a set of air bubbles positioned on top of the at least one sheet.

17. The computer program product of claim 16 wherein the information handling system performs further actions comprising:

generating a first subset of the set of instructions that instruct the at least one platform to move in a first direction based on a first set of constraints corresponding to the at least one platform;

generating a second subset of the set of instructions that instruct the set of pistons to move in a second direction based on a second set of constraints corresponding to the set of pistons;

generating a third subset of the set of instructions that instruct the set of slopers to rotate in a third direction based on a third set of constraints corresponding to the set of slopers; and generating a fourth subset of the set of instructions that instruct the set of air bubbles to move in a fourth direction based on a fourth set of constraints corresponding to the set of air bubbles.

\* \* \* \* \*